(12) United States Patent
Simons et al.

(10) Patent No.: US 6,702,508 B2
(45) Date of Patent: Mar. 9, 2004

(54) MECHANICAL CONNECTION USING NON-CIRCULAR INTER-FITTING COMPONENTS

(75) Inventors: Karl-Heinz Simons, Merzenich (DE); Thomas Svensson, Cologne (DE)

(73) Assignee: Visteon Global Technologies Inc., Dearborn, MI (US)

( * ) Notice: Subject to any disclaimer, the term of this patent is extended or adjusted under 35 U.S.C. 154(b) by 0 days.

(21) Appl. No.: 10/054,100

(22) Filed: Jan. 22, 2002

(65) Prior Publication Data

US 2002/0168222 A1 Nov. 14, 2002

(30) Foreign Application Priority Data

Jan. 20, 2001 (EP) .............................................. 01101247

(51) Int. Cl.[7] ................................................. F16D 3/18
(52) U.S. Cl. .................................. 403/359.2; 403/359.3
(58) Field of Search .......................... 403/359.1, 359.2, 403/359.3, 359.4, 359.5, 359.6

(56) References Cited

U.S. PATENT DOCUMENTS 4,098,096 A * 7/1978 Chard et al. ......... 403/359.2 X
5,460,574 A * 10/1995 Hobaugh ............. 403/359.2 X
6,183,230 B1 * 2/2001 Beardmore et al. ... 403/359.6 X

FOREIGN PATENT DOCUMENTS

DE  3636393 A1  3/1987
DE  198 36 259 A1  2/2000

* cited by examiner

*Primary Examiner*—John R. Cottingham
(74) *Attorney, Agent, or Firm*—Brinks Hofer Gilson & Lione

(57) ABSTRACT

The invention relates to a mechanical connection for transmitting torque, demonstrating a common longitudinal axis a shaft rotating around the longitudinal axis and a hub coaxial to the shaft, its inside contour surrounding the shaft via a slaving section, wherein in the area of the slaving section, the shaft and the inside contour of the hub comprise of at least one retaining section with out-of-round cross section for transmitting torque. In the region of the slaving section, at least one of the shaft or the hub demonstrates at least two retaining sections angularly displaced to each other around the longitudinal axis.

13 Claims, 3 Drawing Sheets

MECHANICAL CONNECTION USING NON-CIRCULAR INTER-FITTING COMPONENTS

BACKGROUND OF THE INVENTION

The present invention generally relates to a mechanical connection using non-circular inter-fitting components for transmitting torque. In particular to shaft/hub connection for transmitting torque.

BACKGROUND OF THE INVENTION

In a typical machine construction, shaft/hub connections are used in may ways for transmitting torques between the shaft and hub. In addition to many requirements, the basic task of such types of connections is usually the transmission of high torques. For transferring such torque, the connections should be as compact and light as possible. In addition, it should be mountable without extensive installation and adjustment work. Dynamic loads are usually higher than static loads.

Since conventional shaft/hub connections usually don't deal with an interference fit, only a certain portion of their contact surfaces truly participates in torque transmission. This causes high stresses in the components, which must be compensated for or reduced by an appropriately long connection. But the connection's enlarged length again causes larger radial run-out and reinforces a relative motion between shaft and hub, during which no transmission of torque occurs (the so-called play). Enlargement of radial run-out also leads to undesired noises and vibrations. A longer connection moreover facilitates sliding of the surfaces upon each other, which again promotes the formation of fretting corrosion. Finally, these effects lead to a reduction in the lifetime of the shaft/hub connection and consequently that of the entire system.

DE 198 36 259 A1 shows a tight shaft/hub connection in which, to diminish or prevent the undesired play, a radial pressing device presses the hub toward the rotational axis in such a manner, that the hub's inside contour engages the shaft free of play. The disadvantage of this embodiment is the need of additional components, which is associated with higher space requirements and costs.

Clamping-bush connections, in which a clamping-bush fits closely between the shaft and hub, are also a known means to reduce or prevent unwanted play. Such a clamping-bush demonstrates at least one element that enables the clamping-bush's annular cross section to be enlarged, thereby pressing the clamping-bush against the shaft's lateral surface on one side and against the hub boring's inner surface on the other side, creating a connection free of play. DE 36 36 393 A1 describes clamping-bushes of such a type, in which positive locking is achieved by fitting both shaft and hub with longitudinal toothing, the clamping-bush being fitted with a matching toothing both on its inside and its outside. This embodiment too is associated with correspondingly higher costs and higher space requirements due to its extra components. More time and a consequently more cost-intensive work step is needed to assemble the clamping-bush.

Wedge-shaped elements, which are inserted between shaft and hub, are also well known. But these lead to an eccentricity of the shaft and therefore to point contacts or relatively small contact surfaces between shaft and hub. Therefore, there is a need in the industry to manufacture a shaft/hub connection that eliminates the above problems.

SUMMARY OF THE INVENTION

It is the objective of the present invention to create a mechanical connection with high functionality and lifetime for transmitting torque. It is yet another objective for the shaft/hub connection to be inexpensive to manufacture and easy to assemble.

The above objects are accomplished by having at least one of the components in the region of the slaving section, demonstrates at least two retaining sections angularly displaced to each other around the longitudinal axis.

The invention is based on the knowledge that a reduction of the play between shaft and hub can only diminish or neutralize high stresses in the component, fatigue, true running, and vibrations and only lead to the objective if the reduction of play occurs while there is a more centered position of the shaft in the hub. The inventors have discovered that longitudinal sections of one of the components, mutually displaced around their longitudinal axis and located in the region of the slaving section, ensure the shaft's centricity within the hub, thereby achieving a more uniform transmission of torque. This can be achieved for example by torsion that extends across the entire length of the slaving section or also by two untorqued longitudinal sections that are connected to each other by a connecting section and mutually displaced therein. Several connecting sections, whose longitudinal sections are displaced against each other in steps or continuously, are also possible.

The reduction or neutralization of play in a centered shaft leads to a more favorable distribution of energy during torque transmission, thereby reducing stresses in the component, fatigue, true running, and vibrations. It is easy and quick to join, especially to thread, or to insert the connection together.

Continuous torsion permits the shaft to be inserted forward into the hub using an input cross section, the hub then turns because of the torsion as insertion becomes deeper and both the input and output cross sections come into contact with the hub. The terms input and output cross section are understood in terms of the shaft's direction of insertion into the hub and refer to the opposite ends of the slaving section.

The shaft's depth of insertion into the hub can be used both to reduce play by means of closely fitting (prestressing) the shaft on the hub and finally achieve a clamping action between shaft and hub. Transmission of torque in both directions free of play and change of direction free of play are consequently possible. Contact points or surfaces arise between the hub and shaft in all cases, at least in the regions of the shaft's input and output cross sections. Due to the elasticity or plasticity of the material, intensified torsion before or during the transmission of torque can achieve a close fit along the entire length of the slaving section through deformation of the shaft and/or hub.

Moreover the degree of torsion can influence and determine different functions and parameters of the shaft/hub connection. A small degree of torsion, for example, means that stronger turning of the torqued component is necessary or possible until the desired effect, such as complete neutralization of play, has been attained. In contrast, torsion progressively running in the direction of the output cross section leads to easy insertion followed by increased turning of the shaft on an increasingly shorter segment. A diminishment or neutralization of play and a clamping action can be rapidly and easily achieved during assembly due to the short insertion distance. Degressive torsion in the direction of the delivery cross section is also conceivable for special applications. Mixed shapes, namely torqued components that can be changed (degressive, progressive, linear) across the length of the slaving section, are possible.

Polygonally shaped, especially trochoidally shaped cross sections of the shaft and hub have proven advantageous. A trochoid arises as the trajectory of a point as the point is carried along when a circle (moving circle) rolls along on or in a circle (rest circle). The number of and implementation of the trochoidal "indentations and bulges" are variable. It has been shown that it is possible to transmit torque with minimum stress and, at the same time, with minimum relative motion between touching surfaces by using a trochoidal contour that has been optimized with respect to the number of "indentations and bulges" and to their large and small diameters. Small differences in the contour of the touching components enable the properties of the shaft/hub connection to be changed, its lifetime and stability in particular.

The shaft/hub connection according to invention is particularly suited for use in automotive engineering, such as for the braking systems and wheel suspensions of motor vehicles. Here it is advantageous that a hub with polygonal inside contour according to invention doesn't have to be broached. It is consequently unnecessary to manufacture it out of steel, the hub could be produced from cast iron for example. The shaft/hub connection according to invention is therefore also suitable in particular for use of this type, because brake systems for example are exposed to high thermal loading.

The invention shall be explained in more detail based on preferred embodiments illustrated in the drawing. It shows:

DETAILED DESCRIPTION OF THE INVENTION

The following description of the preferred embodiment is merely exemplary in nature, and is in no way intended to limit the invention or its application or uses.

Figure 1:
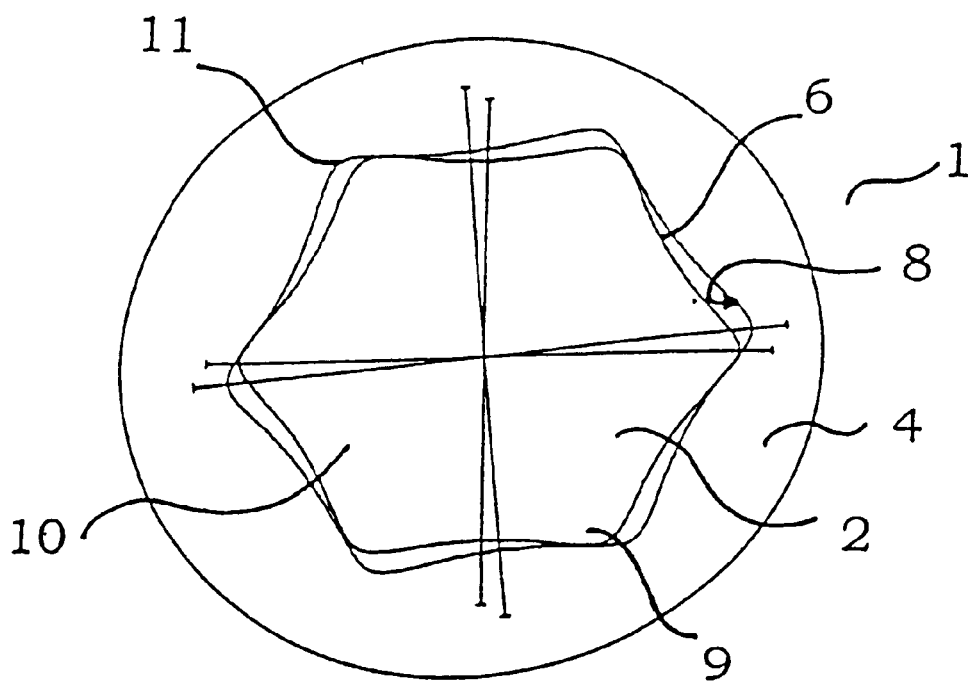
FIG. 1 is a cross sectional view of a shaft/hub connection in the region of the input cross section according to the present invention.

Referring to FIG. 1, a shaft/hub connection is generally shown and represented by reference numeral 1. The shaft 1 hub connection 1 comprises a shaft 2 and hub 4. The examples presented in FIGS. 1 through 4, for example, each demonstrate one shaft 2 and one hub 4.

Figure 2:
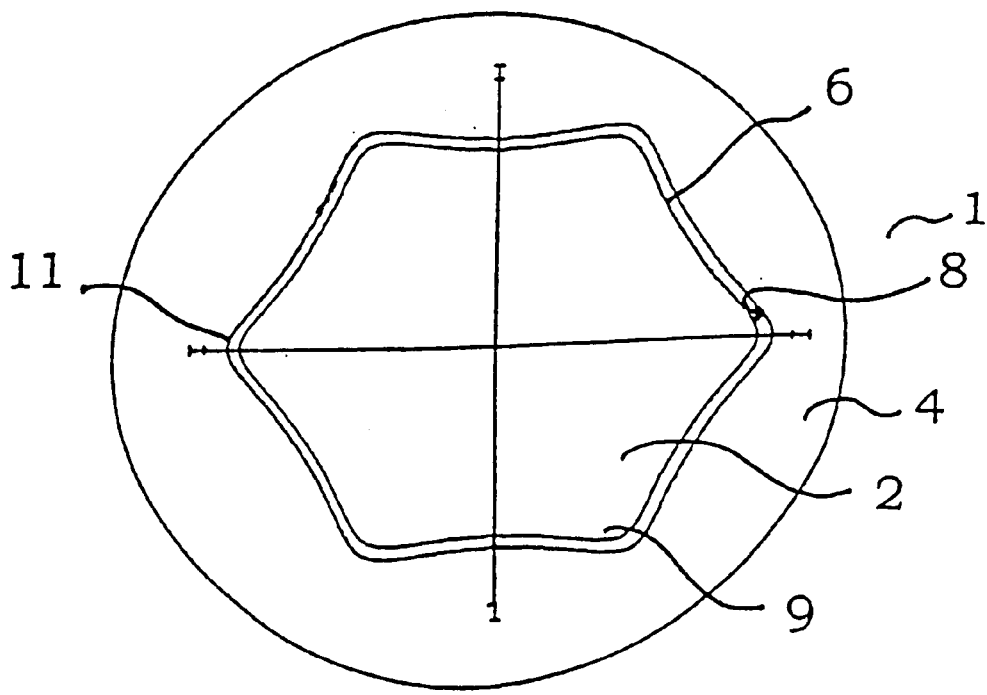
FIG. 2 is a cross sectional view of a shaft/hub connection in the connection's central region according to the present invention.
Figure 3:
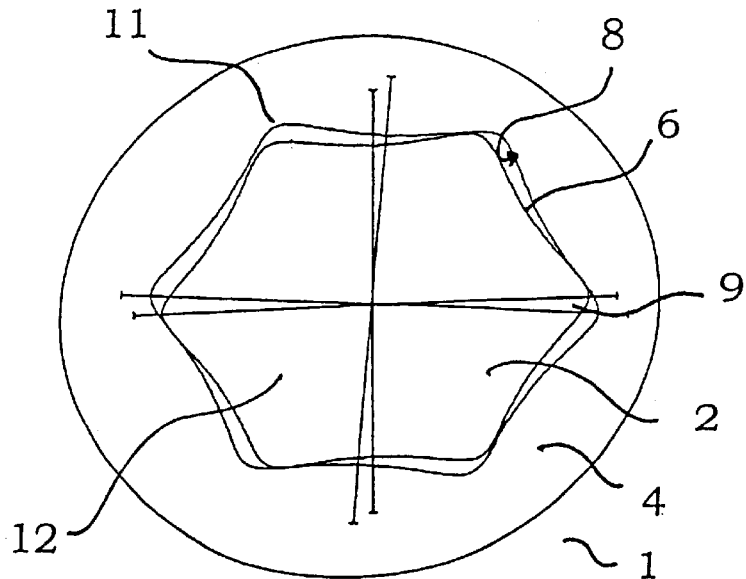
FIG. 3 is a cross sectional view of a shaft/hub connection in the region of the output cross section according to present invention.

FIGS. 1 through 3 show a cross section through a shaft/hub connection 1 according to invention. A shaft 2 with an external contour 6 is guided into a hub 4 with its inside contour 8. The shaft 2 demonstrates trochoidal bulges 9 and the hub 4 demonstrates a corresponding trochoidal indentations 11 relative to its cross section. All other out-of-round cross section shapes are also fundamentally suitable for implementing the invention. A six-sided polygon in particular has proven particularly suitable for transmitting the torque. It has likewise been shown for a six-sided polygon, that a relative eccentricity E between 2 und 10%, preferably between approximately 3 and 5% should be specified. The relative eccentricity E describes the polygon's eccentricity relative to the non-physical average diameter $D_m$ in percent, thus describing a relationship between an external diameter $D_o$ and an internal diameter $D_i$ of the polygon. $D_m$ is the diameter of a circular disk with the same area as the polygon. The term polygon is not to be understood here within its strictest meaning, but rather as an approximate, polygon-like, multi-angular shape. The relative eccentricity E can be computed by the following formula:

$$E=D_i+2\times\epsilon$$

where $$\epsilon=\text{polygon's out-of-roundness}$$

The relative eccentricity E should preferably be derived from the following formula:

$$E=(D_o-D_i/D_o-D_i)\times 50$$

Particularly advantageous polygonal shapes result can be computed from the following formulas in particular (deviation +/−10%):

$$x(\gamma)=(D_m/2)\times\cos(\gamma)+\epsilon\times\cos((n-1)\times\gamma)$$

$$y(\gamma)=(D_m/2)\times\sin(\gamma)-\epsilon\times\sin((n-1)\times\gamma)$$

where $$\gamma=0 \text{ to } 360°, \text{ continuous parameter}$$

$$n=\text{number of sides on the polygon}$$

$$\epsilon=E\times D_m\times 100$$

Figure 4:
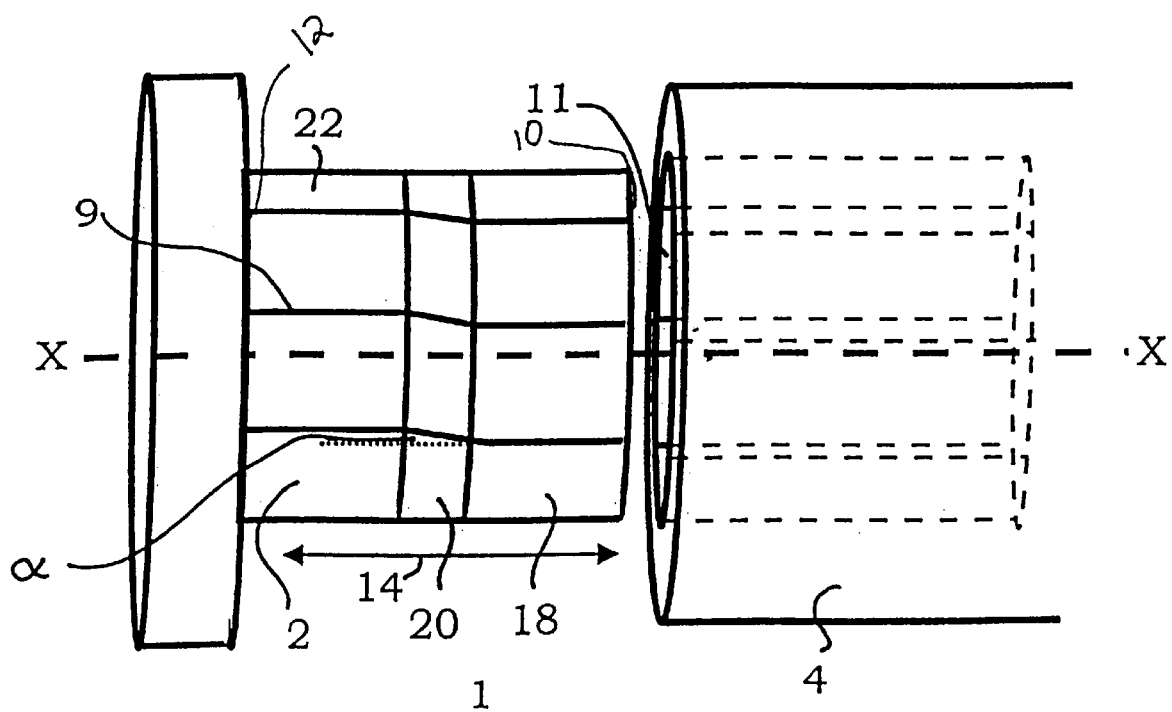
FIG. 4 is a perspective view of a shaft/hub connection wherein the shaft demonstrates untorqued shaft sections that are connected to each other by a torsion section according to the present invention.

For explanation, FIG. 4 shows a three-dimensional principle illustration of the shaft/hub connection 1 according to the invention. Shaft 2 with trochoidal bulges 9 can be inserted into hub 4, which also possesses a trochoidal inside contour 8. Shaft 2 has an input cross section 10 and an output cross section 12, wherein the terms "input" and "output" are understood to mean the insertion direction of the shaft into hub 4; the input cross section 10 for example, is inserted into hub 4 in the axial direction until the hub has surrounded the output cross section 12. In their joined state, shaft 2 and hub 4 demonstrate a mutual longitudinal axis X—X. In their state of assembly, the contact region between the shaft 2 and hub 4 that transmits a torque is labeled as a slaving section 14. Due to manufacturing tolerances, the slaving section 14 is generally shorter than the geometric length of the shaft 2 that can be inserted into hub 4.

In the illustrated examples, the cross section or inside contour 8 of hub 4 is constant across the entire length of the slaving section 14, and is thus neither torqued nor angularly displaced.

FIGS. 1 through 3 relate to a joined shaft/hub connection 1 with a shaft 2 that is continuously torqued over the entire length of the slaving section 14. After the input cross section 10 has been inserted into the hub 4, the torsion from shaft 2 presses the mostly trochoidal bulges 9 against the inside contour 8 of the hub 4 as further insertion occurs. The play of shaft 2, initially present due to the different cross sectional surfaces of shaft 2 and inside contour 8, diminishes and is neutralized when both the input cross section 10 and output cross section 12 of shaft 2 both fit closely within the hub. Depending on the expenditure of energy, pre-stressing or clamping of the shaft 2 in the hub 4 can be achieved as shaft 2 is further inserted or turned without shaft 2 becoming eccentric.

FIG. 1 shows a cross section of the shaft/hub connection 1 in the region of the input cross section 10, FIG. 2 a cross section of the central section of the slaving section 14, and FIG. 3 a cross section in the region of the output cross section 12. The close fit of the trochoidal bulges 9 of shaft 2 to the trochoidal indentations 11 of hub 4 is clearly seen. In contrast to the central section of shaft 2 (FIG. 2), shaft 2 fits closely to hub 4 both in the region of its input cross section 10 (FIG. 1) and in the region of its output cross section 12 (FIG. 3).

FIG. 4 shows a shaft 2 with trochoidal cross section that demonstrates three longitudinal sections in the region of the slaving section 14. The illustration is only to be understood as demonstrating the principle. The geometric ratios are not reflected perfectly for the sake of better understanding. Starting from the input cross section 10, a torqued connecting section 20 connects a first retaining section 18 with a second retaining section 22, wherein the two retaining sections 18, 22 demonstrate an angular displacement to each other around their longitudinal axis X—X due to the torsion of connecting section 20. The trochoidal bulges 9 of retaining sections 18, 22 each run parallel to one another. After the input cross section 10 has been inserted, such an embodiment results in a straight, tight insertion of shaft 2 after the connecting section 20 has come into contact with hub 4 upon further insertion, the shaft 2 is turned around its longitudinal axis X—X and the second retaining section 22 pressed against the hub's inside contour. The angular displacement of the retaining sections 18, 22 to one another diminishes the play in the connection in its joined state. Both retaining sections 18, 22 fit closely to hub 4 along their entire length and consequently each consequently participates in transmitting torque along its entire length. The bulges 9, which run along the connecting section 20, make an angle α with the longitudinal axis X—X, an angle that can be executed so gently that it excludes selflocking between shaft 2 and hub 4. If the angle a is implemented in such a manner that selflocking exists between shaft 2 and hub 4, then an elastic or plastic deformation of shaft 2 will be necessary when shaft 2 is inserted into hub 4.

In a particularly advantageous embodiment, the length of the connecting section 20 amounts to less than 30% of the entire length of the slaving section 14. In principle, it should be endeavored that the connecting section 20 be particularly short, because it would then barely or not at all participate in transmitting torque in the joined state of the shaft/hub connection 1. Given an appropriate degree of torsion, this embodiment can achieve that the components can move relative to each other axially at the same time that both retaining sections 18, 22 are in contact with the hub 4. The angular displacement thus permits torque to be transmitted without play for a prestressed connection.

Figure 5:
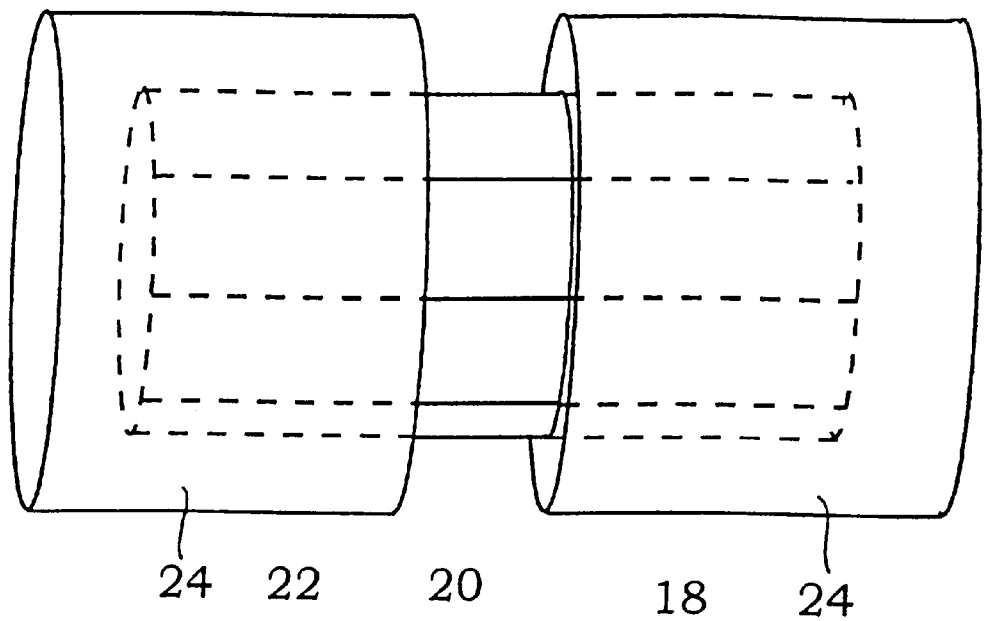
FIG. 5 is a perspective view of the manufacture of the shaft depicted in FIG. 4.

In an illustration principally representing an example, FIG. 5 explains the manufacture of a shaft 2 that is depicted in FIG. 4. The shaft 2, which demonstrates trochoidal bulges 9, is clamped into two lathe tools 24, which are then turned relative to each other by the desired amount in correspondence with the sketched directional circles.

Figure 6:
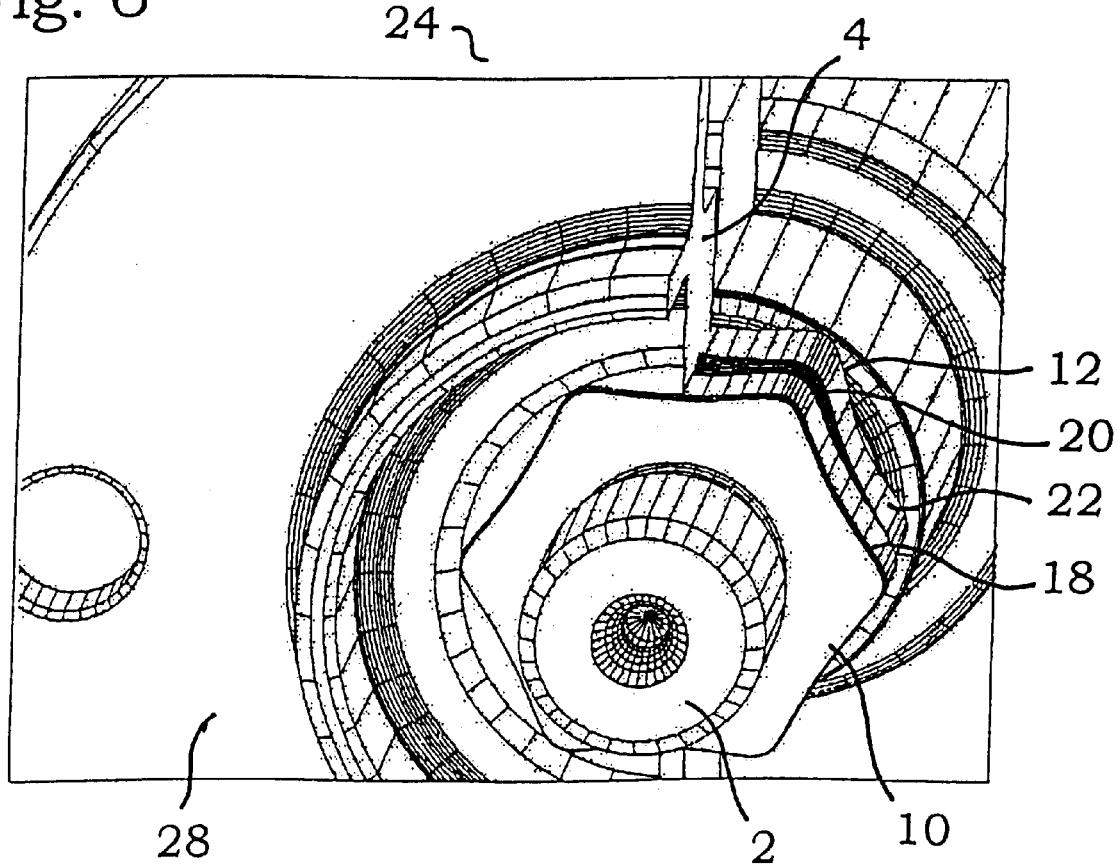
FIG. 6 is a partially cut perspective view of a shaft/hub connection for a motor vehicle's braking system according to the present invention.

FIG. 6 shows the use of a shaft/hub connection 1 according to invention within a braking system 26 in a partially cut perspective illustration. The braking system 26 demonstrates a brake disk 28, which is connected with the hub 4. Slaving segment 14, demonstrating two retaining sections 18, 22 and one connection section 20, can be clearly recognized. The trochoidal external contour of shaft 2 continuously changes proceeding from input cross section 10 toward output cross section 12. Die trochoidal bulges 9 of shaft 2 are less pronounced in the region of the input cross section 10 than in the region of the output cross section 12.

Torque transmission at a minimum of stress and minimum relative motion between the components at the same time is possible by using a trochoidal contour that has been optimized with respect to the number and dimensions of the bulges 9 and indentations 11. Small differences in the contour of touching components permit further improvement in the properties of the shaft/hub connection 1, especially its lifetime and stability. The degree of torsion moreover makes it possible to position shaft 2 into hub 4 exactly.

The minimum length of the slaving section 14 of the shaft/hub connection 1 is determined by working loads and is shorter for the embodiment according to invention than for conventional connections. Reduction of the connecting length leads to diminishment of the play and to improvement of noise and vibration phenomena. The minimum length is the length that suffices to absorb all occurring forces and to transmit the required torque. The number of trochoidal bulges 9 and indentations 11 should be as small as necessary in order to avoid unnecessary restrictions on the rotational motion between shaft 2 and hub 4 in the peripheral direction. Concavely bent sides of shaft 2, as illustrated in FIGS. 1 through 3, are particularly preferred.

Another conspicuous property of this invention is that the same or different materials can be used for shafts 2 and hubs 6. When the shaft/hub connection 1 according to invention is used for the wheel suspensions of motor vehicles for example, hub 2 can produced out of cast iron rather than steel, whereby broaching of hub 2 may be dispensed with. Interesting materials for manufacturing shaft/hub connections 1 according to invention include ceramics, aluminum, steel, MMC, and globular and laminar cast iron. All combinations of these materials can be used.

Shaft 2 or hub 4 or even both components can be torqued in principle. To achieve a fit of shaft 2 and hub 4 that is as exact as possible and to pre-stress them, it is possible to first torque shaft 2 within hub 4 in its inserted state and then remove shaft 2 completely and torque it at another defined angular amount outside of hub 4.

Continuous change of shape of the cross-sectional area of shaft 2 or hub 4 at the same time as torsion across the length of slaving section 14 may also be reasonable. The input cross section 10 and output cross section 12 will then each demonstrate a different cross section. An embodiment of the components can also occur using a cone angle between shaft 2 and hub 4.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A mechanical connection for transmitting torque, comprising:
   a shaft, which rotates around a longitudinal axis; and
   a hub aligned coaxially to said shaft, the hub having an inside contour that surrounds said shaft, the inside contour and the portion of the shaft surrounded by the hub defining a slaving section, said shaft in the region of said slaving section being provided with at least two retaining sections angularly displaced to from each other around said longitudinal axis, each retaining section having an out-of-round cross section for transmitting the torque between the shaft and the hub.

2. The connection of claim 1, wherein said shaft is continuously torqued across the entire length of said slaving section, such that said retaining A, sections are formed by an input cross section and an output cross section, which are arranged on the ends of said slaving section located opposite one another.

3. The connection of claim 2, wherein the torsion runs linearly proceeding from said input cross section toward said output cross section.

4. The connection of claim 2, wherein the torsion runs degressively proceeding from said input cross section toward said output cross section.

5. The connection of claim 2, wherein the torsion runs progressively proceeding from said input cross section toward said output cross section.

6. The connection of claim 1, wherein said retaining sections are connected to each other by a connecting section that is continuously torqued around said longitudinal axis.

7. The connection of claim 6, wherein said connecting section has a length that is less than 30% of the total length of said slaving section.

8. The connection of claim 1, wherein said retaining sections are displaced from one another in steps.

9. The connection of claim 1, wherein said shaft defines a polygonal shaped external contour and said hub defines a polygonal shaped inside contour.

10. The connection of claim 9, wherein said shaft defines a six-sided external contour and said hub defines a six-sided inside contour, wherein the relative eccentricity E is between about 3% and 5% and is computed by the formula $E=(D_o-D_i/D_o-D_i)\times 50$.

11. The connection of claim 6, wherein, said polygonal contours are determined by the following formulas:

$$x(\gamma)=(D_m/2)\times\cos(\gamma)+\epsilon\times\cos((n-1)\times\gamma)$$

$$y(\gamma)=(D_m/2)\times\sin(\gamma)-\epsilon\times\sin((n-1)\times\gamma).$$

12. The connection of claim 1, wherein said shaft and said hub demonstrate a cone angle.

13. The connection of claim 1, wherein at least one of said shaft or said hub demonstrates a change in the shape of its cross-sectional area along the length of said slaving section.

* * * * *

UNITED STATES PATENT AND TRADEMARK OFFICE
CERTIFICATE OF CORRECTION

PATENT NO. : 6,702,508 B2
DATED : March 9, 2004
INVENTOR(S) : Karl-Heinz Simons et al.

It is certified that error appears in the above-identified patent and that said Letters Patent is hereby corrected as shown below:

Title page,
Item [75], Inventors, delete "Cologne" and substitute -- Koeln -- in its place.

Column 6,
Line 63, immediately after "shaft" delete "," (comma).

Column 7,
Line 2, after "displaced" delete "to".
Line 8, after "retaining" delete "A,".

Signed and Sealed this

Tenth Day of August, 2004

JON W. DUDAS
*Acting Director of the United States Patent and Trademark Office*